United States Patent [19]

Zscheile, Jr. et al.

[11] Patent Number: 5,504,787

[45] Date of Patent: Apr. 2, 1996

[54] COHERENT SEQUENTIAL PN CODE EXTRACTOR

[75] Inventors: John W. Zscheile, Jr., West-Farmington; Alan E. Lundquist, Salt Lake City; Robert A. Wright, Sandy, all of Utah

[73] Assignee: Loral Corporation, New York, N.Y.

[21] Appl. No.: 216,744

[22] Filed: Mar. 23, 1994

[51] Int. Cl.⁶ .................................................. H04L 7/00
[52] U.S. Cl. ........................... 375/367; 375/208; 370/107
[58] Field of Search ................................. 375/1, 115, 354, 375/359; 370/107; 380/34

[56] References Cited

U.S. PATENT DOCUMENTS

| | | | |
|---|---|---|---|
| 4,301,537 | 11/1981 | Roos | 375/115 |
| 4,852,121 | 7/1989 | Kingston et al. | 375/1 |
| 4,875,221 | 10/1989 | Mori | 375/1 |
| 5,048,053 | 9/1991 | Mower et al. | 375/115 |
| 5,105,437 | 4/1992 | Kingston et al. | 375/115 |

*Primary Examiner*—Stephen Chin
*Assistant Examiner*—Don N. Vo
*Attorney, Agent, or Firm*—Stanton D. Weinstein; Glenn W. Bowen; John B. Sowell

[57] ABSTRACT

Apparatus and a method for increasing the speed of acquisition of PN coded signals includes a novel PN code clock extraction circuit which is coupled in parallel to a code tracking loop and acquisition loop of a PN receiver of the type having a replica PN code generator which is slip controlled to synchronize with the received PN coded signals. The novel PN code clock extraction circuit detects the clock transition of the received PN coded signals and synchronized the replica PN code generator clock transition signals so that there is no misalignment during acquisition. A switch control in the acquisition loop circuit senses the synchronization of the replica PN code generator transition and the received PN code transition and disconnects the PN code clock extraction circuit after synchronization of clock transition and before acquisition of the PN code so that the acquisition loop detects the PN code synchronization with a full strength signal.

9 Claims, 3 Drawing Sheets

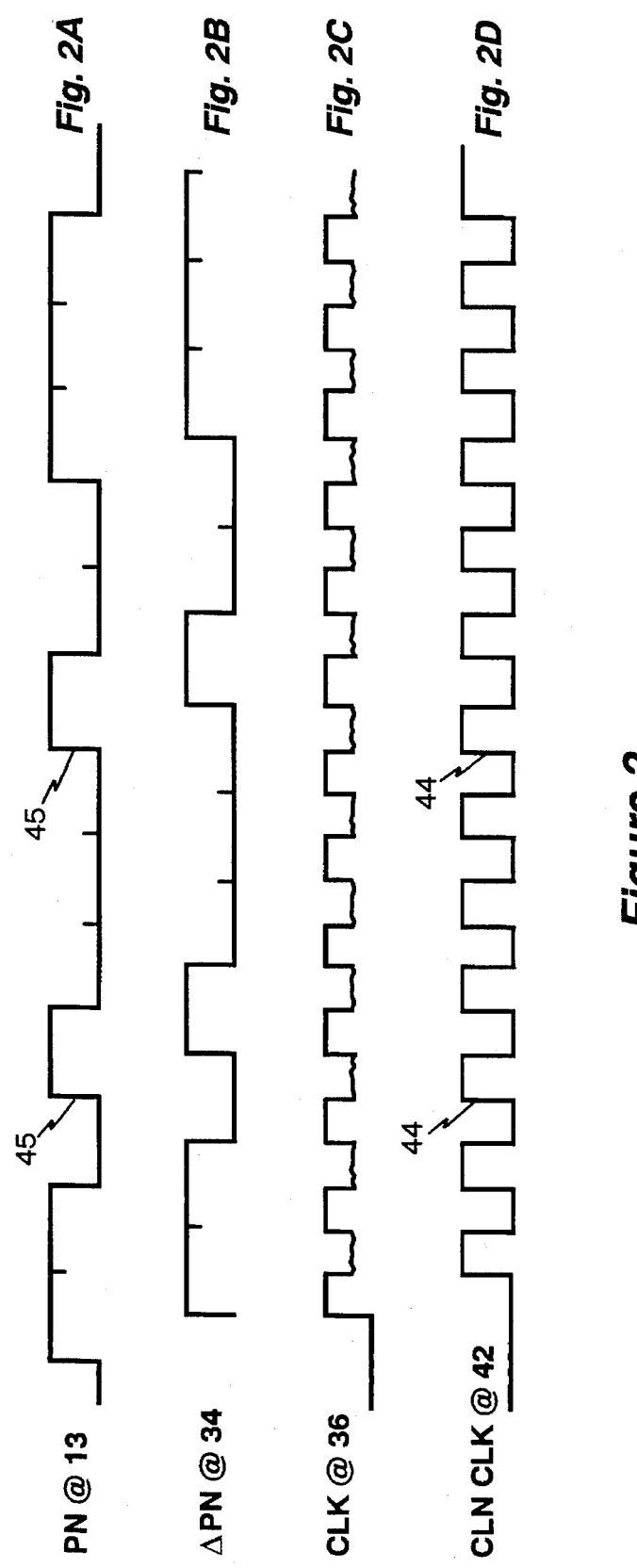

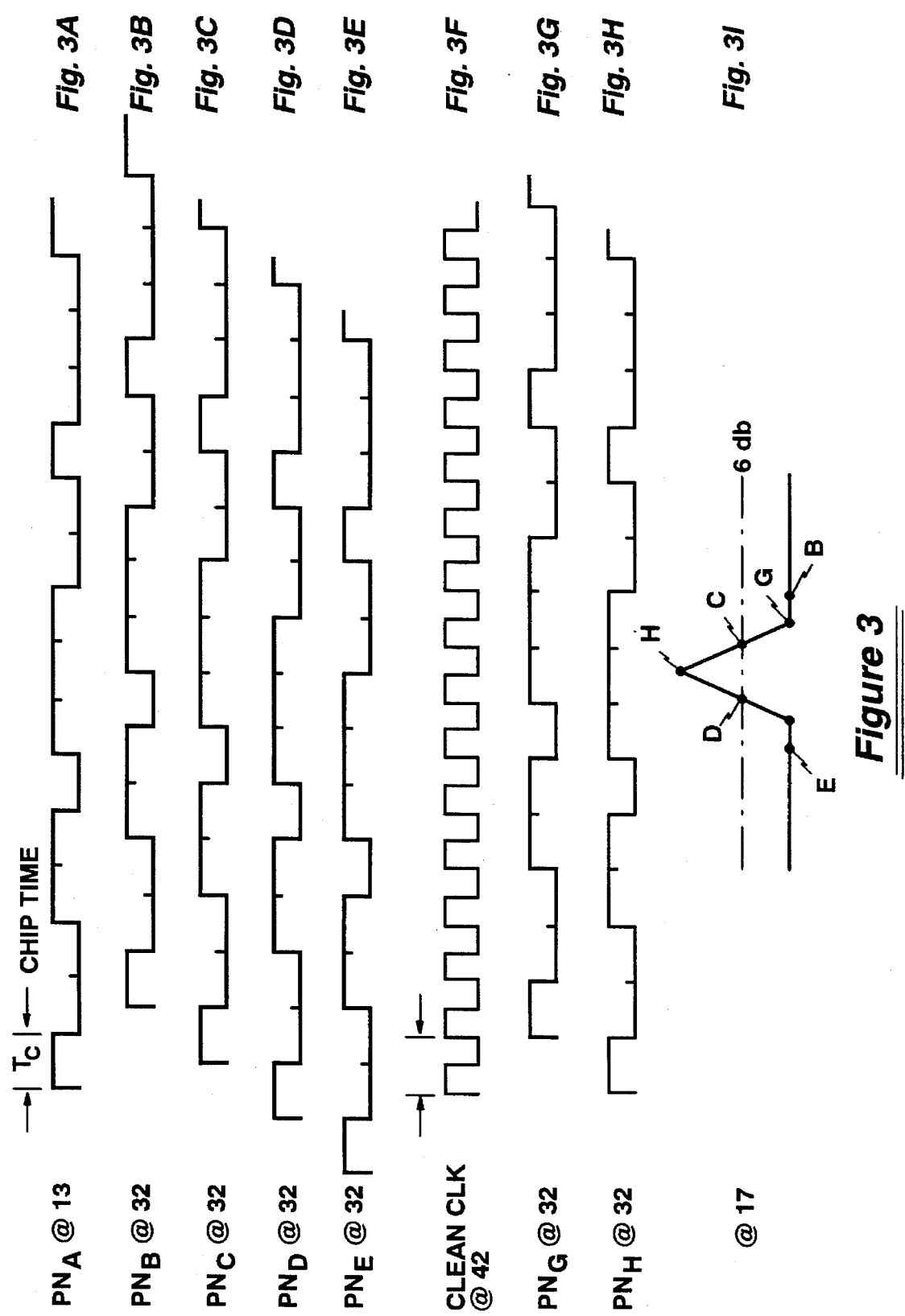

COHERENT SEQUENTIAL PN CODE EXTRACTOR

BACKGROUND OF THE INVENTION

1. Field of the Invention

The present invention relates to Pseudo Noise (PN) code receivers and PN code detection loops used to receive and acquire incoming PN coded signals. More particularly, the present invention relates a novel PN code extractor circuit employed with a PN code receiver and code detector to enhance the strength of the acquired signal.

2. Description of the Prior Art

PN code receivers and code detection loops are known and have been used to receive incoming PN coded signals. The received signal is received at a random time and phase until the slip control circuits slip the PN replica generator code one chip at a time to achieve correlation.

It can be shown that in the prior art a worse case condition with one-half chip offset that the correlation signal is attenuated by 6 decibels when attempting to acquire the received PN code.

It has been suggested that in the prior art that the slip and control circuits could be modified to slip the PN replica code in one-half chip steps. While this known technique does reduce the worst case condition to an attenuation loss of only 2.5 decibels, the search time for correlation is doubled which results in the equivalent addition of 3 decibels for a total loss of 5.5 decibels. Thus, the overall accomplishment by employing a one-half chip steps during search and acquisition is substantially the same as using a one chip search.

It would be highly desirable to provide any type of circuit or system which would result in enhancing the speed of acquisition of a PN code.

SUMMARY OF THE INVENTION

It is a primary object of the present invention to provide a novel PN code clock extraction circuit for increasing the speed of acquisition of transmitted PN coded signals.

It is another primary object of the present invention to provide a novel PN code clock extraction circuit which permits an increase in the speed of search of transmitted PN coded signals by a factor of four.

It is another primary object of the present invention to provide a novel PN code clock extraction circuit for searching a transmitted PN code signal at the same speed as prior art signals in a jamming environment which is four times as intense.

It is another primary object of the present invention to provide a novel PN code clock extraction circuit which permits transmitted PN coded signals to have one-fourth the power as heretofore and still maintain the same acquisition speed.

It is a general object of the present invention to provide a novel PN code clock extraction circuit that can be added to existing receiving and detection circuits for new products or retrofitted into old products.

BRIEF DESCRIPTION OF THE DRAWINGS

FIG. 3A–3I are the more detailed schematic wave form drawings which compares one chip prior art sequential search signals with the present invention one chip sequential search wave form sign signals.

DETAILED DESCRIPTION OF THE PREFERRED EMBODIMENT

Figure 1:
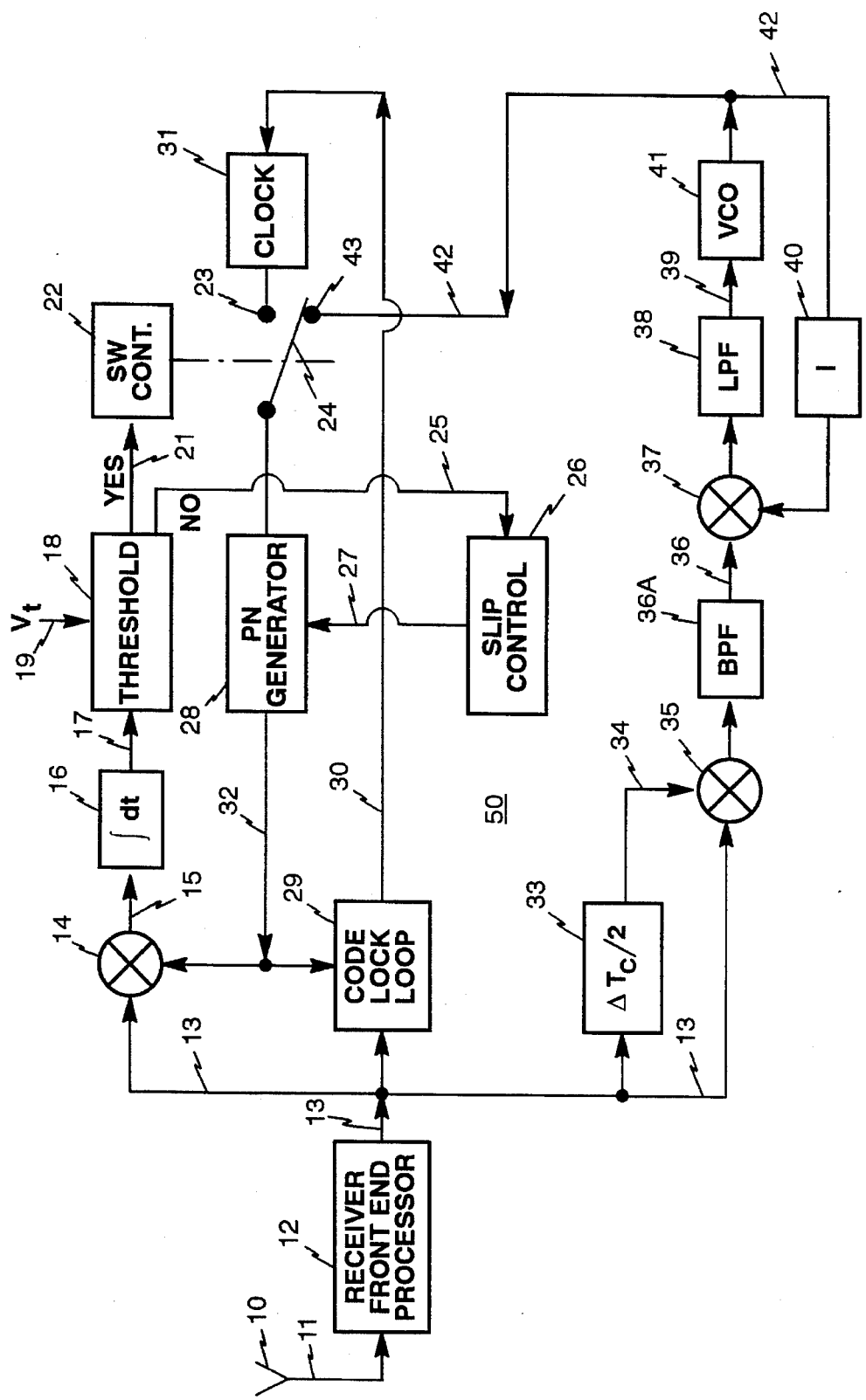
FIG. 1 is a schematic block diagram of a typical PN code receiver incorporating a PN code detection and code tracking loop which has been modified to include the present invention PN code clock extraction circuit, FIG. 2 (including FIGS. 2A-2D) is a schematic wave form drawing showing the timing of the received PN code signals and the extracted PN clock.

Refer now to FIG. 1 showing a schematic block diagram of the present invention PN code clock extraction circuit in a typical environment of a PN code receiver having a PN code detection loop and code tracking loop. The transmitted PN signal is received at an antenna 10 and coupled as a input by line 11 to a receiver and front end processor 12 which produces a processed output on line 13. The process signal on line 13 is shown applied to a mixer 14 which produces a correlated output on line 15 which is applied to an integrating circuit 16 to produce a correlated output signal on line 17. The correlated output signal on line 17 is applied to a threshold comparison circuit 18 having a predetermined voltage threshold input shown on line 19. If the correlated signal on line 17 exceeds the predetermined threshold on line 19, a signal is produced on line 21 which is applied to a switch control circuit 22 which would cause the switch 24 to switch to the terminal 23 or lock position which will be explained in greater detail hereinafter. When the incoming correlated signal on lines 17 does not exceed the predetermined voltage threshold set on line 19, a "no" condition is produced on line 25 and this signal on line 25 is applied to the slip control circuits 26 which produces an output control signal on line 27 that causes the PN generator 28 to slip one chip.

After slipping the PN generator, the circuit previously explained builds up another correlation signal on line 17 and determines whether this new signal exceeds the threshold on line 19. This series of slipping and testing steps continues until the threshold detection circuit determines that the incoming signal on line 17 exceeds the threshold set on line 19 which produces an output signal on line 21 to the switch control 22 that causes the switch 24 to switch to the terminal 23 position or lock position.

When the switch 24 switches to the lock position 23, the code lock loop 29, 30 maintains clock 31 in alignment with the chip in the received signal.

During this acquisition sequence or process the alignment of the replica code produced by the PN generator on line 32 can be in a worse case condition and out of alignment by one-half chip which results in a signal loss of 6 decibels.

The processed PN coded signal on line 13 is also applied to a delay circuit 33 which produces one-half chip delay on line 34 which is applied to the mixer 35 which also has a process signal from line 13 applied as an input. The output of mixer 35 is applied to a narrow band pass filter 36A to provide on line 36 a signal which contains the coherent PN clock free from uncorrelated wide band non gaussian noise.

The signal on line 36 is applied to a phase lock loop which comprises a phase detector mixer 37 having an output applied to a low pass filter 38 which produces a filtered output on line 39 that is applied to a voltage controlled oscillator 41 which produces a clean clock signal on output line 42. The clean clock signal on line 42 is fed back to the phase detector mixer 37 via an inverter 40 and also applied to the terminal 43 of switch 24.

It will be understood that during the acquisition phase of the incoming PN signal that the novel extractor circuit 50 is connected in series as shown with the PN generator 28, thus guaranteeing that the chips of the incoming signal on line 13 are identically lined up with the chips produced on line 32 from the PN generator before acquisition occurs. After acquisition occurs, the threshold detector 18 produces an output signal on line 21 to switch control circuit 22. The switch 24 is shifted to its 23 lock terminal position and the novel extractor circuit 50 is no longer required or connected into the circuit. It will be understood that the alignment of the true clock with the incoming signal occurs very rapidly compared to the time needed for a search sequence required for acquisition of the incoming PN code.

Refer now to FIG. 2 showing a schematic wave form drawing of the timing of the received PN code and the extractor's true clock. The wave form on line 13 is shown as the received PN signal at the upper most wave form of FIG. 2. The second wave form on line 34 represents the delayed PN signal shown in the first wave form. The signal on line 34 was explained as being processed by mixer 35 to produce the clock with uncorrelated noise. This clock signal on line 36 is shown as the third wave form. The clock which is produced on line 36 is processed in the phase lock loop circuity 50 to produce the clean clock on line 42 which is shown inverted from the clock on line 36 before it is applied to the PN generator 28. It will be noted that the leading edge 44 of the received clean clock lines up with the leading edge 45 of the received PN signal on line 13.

Refer now to FIG. 3 showing more detailed schematic wave form drawings which compares the one chip prior art signal search wave form with the present invention one chip sequential wave form. The topmost wave form shown as FIG. 3A represents the incoming signal on line 13 and has designated the chip time $T_c$ of the first $PN_A$ chip. Wave form FIG. 3B represents the first misaligned PN signal being generated by the PN generator 28 and presented on output line 32. The sequential wave forms FIG. 3C, FIG. 3D and FIG. 3E represent the PN signals $PN_B$, $PN_C$, $PN_D$ and $PN_E$ that are being presented on line 32 after the PN generator is slipped one chip time and are separated from each other by one chip.

Refer now to the aforementioned clean clock which appears at FIG. 3F on line 42. The clock time $T_c$ is identical to and aligned with the chip time $T_c$ shown in wave form FIG. A. At the point in time when the extractor circuit 50 is connected to the PN generator 28, a wave form $PN_C$ shown in FIG. 3G is being presented at the output line 32 and represents the last chip slippage before alignment. The slip control circuit 26 slips the wave form shown in FIG. 3G so that it produces the wave form shown in FIG. 3H and by one chip time and causes the wave form $PN_H$ to be in perfect alignment with the incoming signal shown on line 13 at FIG. 3A.

A wave form FIG. 3I represents the amplitude or correlation between the signal on line 13 and the signal on line 32 as detected and presented on line 17. Point B on wave form FIG. 3I represents correlation of wave form $PN_B$ with wave form $PN_A$. In similar manner, the wave forms $PN_C$ and $PN_D$, are shown having partial correlation loses at points C and D. The correlation wave form $PN_B$ and $PN_E$ are absolute zero. It will be noted that under worse case conditions, the loss or wave form $PN_C$ and $PN_D$ will be 6 decibels loss. When the present invention extractor circuit is included in the acquisition loop of FIG. 1, the wave form $PN_H$ which achieves alignment will be in perfect alignment and incurs no correlation loss as shown at point H on the wave form FIG. 3I.

Having explained a preferred embodiment of the present invention, it will be understood that the present invention should not be limited by the explanation which is associated with a simple acquisition and tracking circuit for a PN receiver. The present invention may be employed in complex acquisition and tracking and loops which have the same problem. Stated differently, any acquisition and tracking loop which may incur a half correlation or half chip correlation problem that results in a 6 decibel acquisition loss can employ the present invention to recover the 6 decibel loss without substantial change in the original circuitry. The present invention may be added to numerous types of acquisition and tracking loops to achieve the present desired result having no correlation loss during acquisition.

What is claimed is:

1. A Pseudo Noise (PN) code acquisition and code tracking circuit of the type used to receive PN coded signals to acquire and track said PN coded signals, comprising:

a receiver acquisition loop having an input coupled to receive said PN coded signals, a replica PN code generator having an output coupled in said receiver acquisition loop for generating a replica code to be synchronize with the received PN coded signals during acquisition, a code tracking loop having an input coupled to said PN coded signals and an output, switch means operable by said acquisition loop and connected to the input of said replica PN code generator, wherein said output of said code tracking loop is connectable by said switch means to said replica PN code generator, and a coherent PN code clock extraction circuit having an input coupled to said PN coded signals and a clock output coupled through said switch means to said replica PN code generator during acquisition and disconnected by said switch means from said replica code PN generator when said tracking loop is connected to said replica PN code generator by said switch means, wherein said switch means is operable by said acquisition loop for selectively connecting either said output of said code tracking loop, or said clock output of said coherent PN code clock extraction circuit, to said replica PN code generator.

2. A PN code acquisition and code tracking circuit as set forth in claim 1 wherein said switch means comprises a switch controller, and said acquisition loop comprises a threshold detector coupled to said switch controller for connecting said tracking loop to said replica PN code generator and for disconnecting said coherent PN code clock extraction circuit from said replica PN code generator when said threshold detector generates an output signal indicative of the output of said coherent PN code clock extraction circuit being synchronized with the received PN coded signals.

3. A PN code acquisition and code tracking circuit as set forth in claim 2 wherein said acquisition loop further comprises a slip control circuit coupled to said replica PN code generator and to said threshold detector for slipping the replica PN code output of said PN code generator one chip when the threshold detector generates an output signal indicative of the output of said PN code clock extraction circuit being not synchronized with the received PN coded signals.

4. A PN code acquisition and code tracking circuit as set forth in claim 1 wherein said coherent PN code clock extraction circuit comprises means for producing a coherent clock signal which is synchronized with said PN coded signals.

5. A PN code acquisition and code tracking circuit as set forth in claim 1 wherein said coherent PN code clock extraction circuit comprises a delay and multiply circuit coupled to a phase lock loop circuit.

6. A PN code acquisition and code tracking circuit as set forth in claim 5 wherein said phase lock loop circuit comprises a mixer coupled to a voltage controlled oscillation (VCO), and further comprises an inverter in a feed back line coupled between the output of said VCO and an input of said mixer.

7. A PN code acquisition and code tracking circuit as set forth in claim 5 wherein said delay and multiply circuit comprises a one half chip delay.

8. A coherent PN code clock extraction circuit for enhancing the time of acquiring a received PN coded signal, comprising:
- a receiver including a replica PN code generator for generating a replica code to be synchronized with the received PN coded signal during acquisition, an acquisition circuit receiving the received PN coded signal, for performing acquisition of the received PN coded signal and a code tracking circuit receiving the received PN coded signal for performing tracking of the received PN coded signal, said replica PN code generator having an output connected to said acquisition circuit and to said code tracking circuit,
- switch means controlled by said acquisition circuit for selectively connecting said code tracking circuit to an input of said replica PN code generator,
- an extraction circuit comprising a delay and multiplying circuit having an input coupled to the received PN coded signals for producing a coherent clock signal from said received PN coded signals.
- said extraction circuit comprising a phase lock loop circuit coupled to the output of said delay and multiplying circuit for producing a clean clock signal and
- the output of said phase lock loop circuit being coupled by said switch means to said replica PN code generator during acquisition and being disconnected from said PN code generator by said switch means after acquisition.

9. A method of increasing the speed of acquisition of transmitted PN coded signals, comprising the steps of:
- receiving the transmitted PN coded signals,
- applying the received PN coded signals to an acquisition loop, a code tracking loop and a PN code clock extraction circuit,
- disconnecting the output of said code tracking loop from said acquisition loop,
- connecting the output of said PN code clock extraction circuit to said acquisition loop,
- acquiring a coherent clock signal in said received PN coded signals, and
- simultaneously disconnecting the output of said PN code clock extraction circuit and connecting said code tracking loop to said acquisition loop whereby the acquisition of said PN coded signals occurs in exact phase synchronism with the transitions of said received PN coded signals.

* * * * *